(12) United States Patent
Bakfan et al.

(10) Patent No.: US 8,219,107 B2
(45) Date of Patent: Jul. 10, 2012

(54) METHOD AND SYSTEM FOR IMPROVING QUALITY OF SERVICE OVER A FIXED NETWORK

(75) Inventors: Shay Bakfan, Netanya (IL); Hezi Manos, Givatayim (IL)

(73) Assignee: Celtro Ltd, Petach Tikva (IL)

( * ) Notice: Subject to any disclaimer, the term of this patent is extended or adjusted under 35 U.S.C. 154(b) by 396 days.

(21) Appl. No.: 12/523,489

(22) PCT Filed: Feb. 12, 2008

(86) PCT No.: PCT/IL2008/000179
§ 371 (c)(1),
(2), (4) Date: Jul. 16, 2009

(87) PCT Pub. No.: WO2008/099388
PCT Pub. Date: Aug. 21, 2008

(65) Prior Publication Data
US 2010/0015989 A1    Jan. 21, 2010

Related U.S. Application Data

(60) Provisional application No. 60/890,496, filed on Feb. 18, 2007.

(51) Int. Cl.
*H04W 72/00* (2009.01)
(52) U.S. Cl. ............... 455/453; 455/561; 455/556.1; 370/465; 370/470
(58) Field of Classification Search .......... 455/450–454; 370/331–344
See application file for complete search history.

(56) References Cited

U.S. PATENT DOCUMENTS

| 4,751,510 | A | * | 6/1988 | de Saint Michel et al. | 340/3.31 |
| 6,111,893 | A | * | 8/2000 | Volftsun et al. | 370/466 |
| 6,138,020 | A | * | 10/2000 | Galyas et al. | 455/436 |
| 2003/0156580 | A1 | | 8/2003 | Abraham et al. | |
| 2005/0164705 | A1 | * | 7/2005 | Rajkotia et al. | 455/436 |
| 2006/0050732 | A1 | * | 3/2006 | Read | 370/465 |
| 2007/0070923 | A1 | * | 3/2007 | Honma et al. | 370/258 |
| 2008/0239976 | A1 | * | 10/2008 | Altman | 370/252 |

FOREIGN PATENT DOCUMENTS
WO    WO2005/048623 A1    5/2005

OTHER PUBLICATIONS

International Preliminary Report on Patentability for international application No. PCT/IL2008/000179, having international filing date of Feb. 12, 2008.

* cited by examiner

*Primary Examiner* — Rafael Perez-Gutiérrez
*Assistant Examiner* — Keith Fang
(74) *Attorney, Agent, or Firm* — Smith Risley Tempel Santos LLC; Gregory Scott Smith

(57) ABSTRACT

The amount of data that is transmitted over a cellular network is reduced thereby providing an improvement in the quality of service. The data reduction is obtained by intercepting data units transferred over a bearer between two nodes, such as a BTS and BSC. The current load for a bearer is determined and based on the current load, the source of the data is requested to change the bit rate of subsequent data units. Thus, the bit rate of data that is transmitted toward two intermediate nodes is changed in order to control the load over a bearer that connects the two intermediate nodes.

19 Claims, 3 Drawing Sheets

METHOD AND SYSTEM FOR IMPROVING QUALITY OF SERVICE OVER A FIXED NETWORK

CROSS-REFERENCE TO RELATED APPLICATIONS

This application is a non-provisional patent application filed under 35 U.S.C. 371 and claiming priority to and the benefit of U.S. Provisional Application for Patent 60/890,496 filed on Feb. 18, 2007, through International Application PCT/IL2008/000179 filed on Feb. 12, 2008, of which both applications are hereby incorporated by reference.

BACKGROUND OF THE INVENTION

The subject matter of the present disclosure relates to the field of cellular fixed networks and, more specifically, to providing improved Quality of Service (QoS) over a terrestrial radio access network.

The rapid evolution of communication over wireless communication networks for mobile communications, such as but not limited to, 2G networks, etc., creates a demand for increasing bandwidth over cellular fixed networks. The demand for increasing the bandwidth of the cellular fixed network pushes more and more cellular network operators to add data manipulation equipment between central nodes, such as but not limited to base station controllers (BSC), and its associated cells, such as but not limited to base transceiver stations (BTS).

Common manipulation equipment is capable of intercepting the data traffic on both sides of a bearer that carries cellular data between a central node and a cell over the cellular fixed network, and aggregating data units and/or manipulating the data in order to reduce the number of bits that are transmitted over the associated bearer. On the other side of the bearer, mating manipulation equipment de-manipulates the manipulated data into the original data format and the de-manipulated data is transmitted toward its final destination. Exemplary manipulation equipment may aggregate data units, reduce padding bits, idle data frames, unused data frames etc. Manipulation methods themselves are not part of the present disclosure and shall thus not be described in detail here. Detailed information about manipulation methods can be obtained from many sources. For example, U.S. patent application Ser. Nos. 11/194,918; 10/830,081; 11/408,418; and 11/464,204 disclose several types of manipulation equipments and methods.

Since manipulation equipment can reduce the volume of data over a bearer between a central node and a cell, the bearer associated with the manipulation equipment can carry more connections than a common bearer. Therefore, the central node and/or the cell can be configured as having two or more dummy bearers instead of the real one. Furthermore, common central nodes and/or cells have a mechanism that can control the bit-rate of the data that is created by a mobile telephone or cellular device in order to reduce the volume of the data over the network. For example, in a GSM fixed network, a BSC can change the bit-rate that is currently used by an adaptive multi-rate (AMR) codec for compressing the audio data to/from a cellular device. Such a mechanism may not be effective if the central node is configured as having more bearers than the real one.

Therefore, there is a need in the art for a system and method that can measure temporary load over a bearer that connects two nodes, such as a central node with a cell and change the bit-rate that is created by a source of data. Such a system can adapt the volume of the data to the capacity of a bearer and its associated manipulation equipment. Furthermore, such a system can lead a source of data, a cellular telephone or other cellular device for example, to change its data format in order to deliver a data format that can be manipulated more efficiently by the associated manipulation equipment.

Therefore, there is a need in the art for a system and method for leading a source of data to change its bit rate into another bit rate in order to match the load over a bearer and to improve the QoS and the utilization of the data manipulation equipment in reducing the number of bits that are transmitted over a cellular network.

BRIEF SUMMARY OF THE INVENTION

Exemplary embodiments of the present invention provide novel apparatus and improved methods for improving QoS over the cellular network, reducing the number of bytes that are transmitted over a bearer between two nodes, such as between a BSC and a BTS, for example. An exemplary apparatus can be capable of intercepting data units, such as but not limited to, Abis frames, which are transferred over a bearer between a BTS and a BSC, for example and changing certain control bits that lead a source of data, such as a cellular phone, to change the bit rate of the next data units in order to improve the QoS over the network and/or the efficiency of an associated manipulation device.

Exemplary embodiments of the present invention may parse a received Abis data frame in search of control bits that can influence the bit rate that is used by the destination of the current data frame. The destination of the current data frame will be the source of the next data frame which will be transferred in the other direction. An Abis frame that has a reduced bit rate data chunk can include more padding bits in order to reach the required size of an Abis frame (40 bytes, for example). The padding bits will be easily removed by a manipulation equipment, reducing the number of bits that are transmitted over the bearer.

An embodiment of the present invention may intercept data traffic over a bearer, parse the Abis frames, search for audio data frames that were compressed according to the AMR compression standard, and manipulate the control bits requesting the destination of the data frame to reduce the bit rate of its AMR encoder.

Other exemplary embodiments of the present invention can be adapted to establish a connection with a central controller of the cellular network (a BSC, or RNC for example) or with a source of data, a web-server, a video server, etc. The connection can be based on the Internet Protocol (TCP/IP, for example) or any other type of protocol that can be used between two devices. Over the connection, an indication about the current load over the bearer can be sent, requesting the central node or the server to reduce the bit rate that is sent toward the bearer.

Yet, another exemplary embodiment of the present invention may generate and send an indication to the associated node that one of the dummy bearers/trunks failed, thereby causing the node to reduce the load. In this disclosure, a trunk is used as an interchangeable term for a connection link between manipulation equipment and its associated node.

The foregoing summary is not intended to summarize each potential embodiment or every aspect of the present disclosure, and other features and advantages of the present disclosure will become apparent upon reading the following detailed description of the embodiments with the accompanying drawings and appended claims.

Furthermore, although specific exemplary embodiments are described in detail to illustrate the inventive concepts to a person skilled in the art, such embodiments are susceptible to various modifications and alternative forms. Accordingly, the Figures and written description are not intended to limit the scope of the inventive concepts in any manner.

BRIEF DESCRIPTION OF THE SEVERAL VIEWS OF THE DRAWING

Exemplary embodiments of the present invention will be understood and appreciated more fully from the following detailed description, taken in conjunction with the drawings in which.

DETAILED DESCRIPTION OF THE INVENTION

Figure 1:
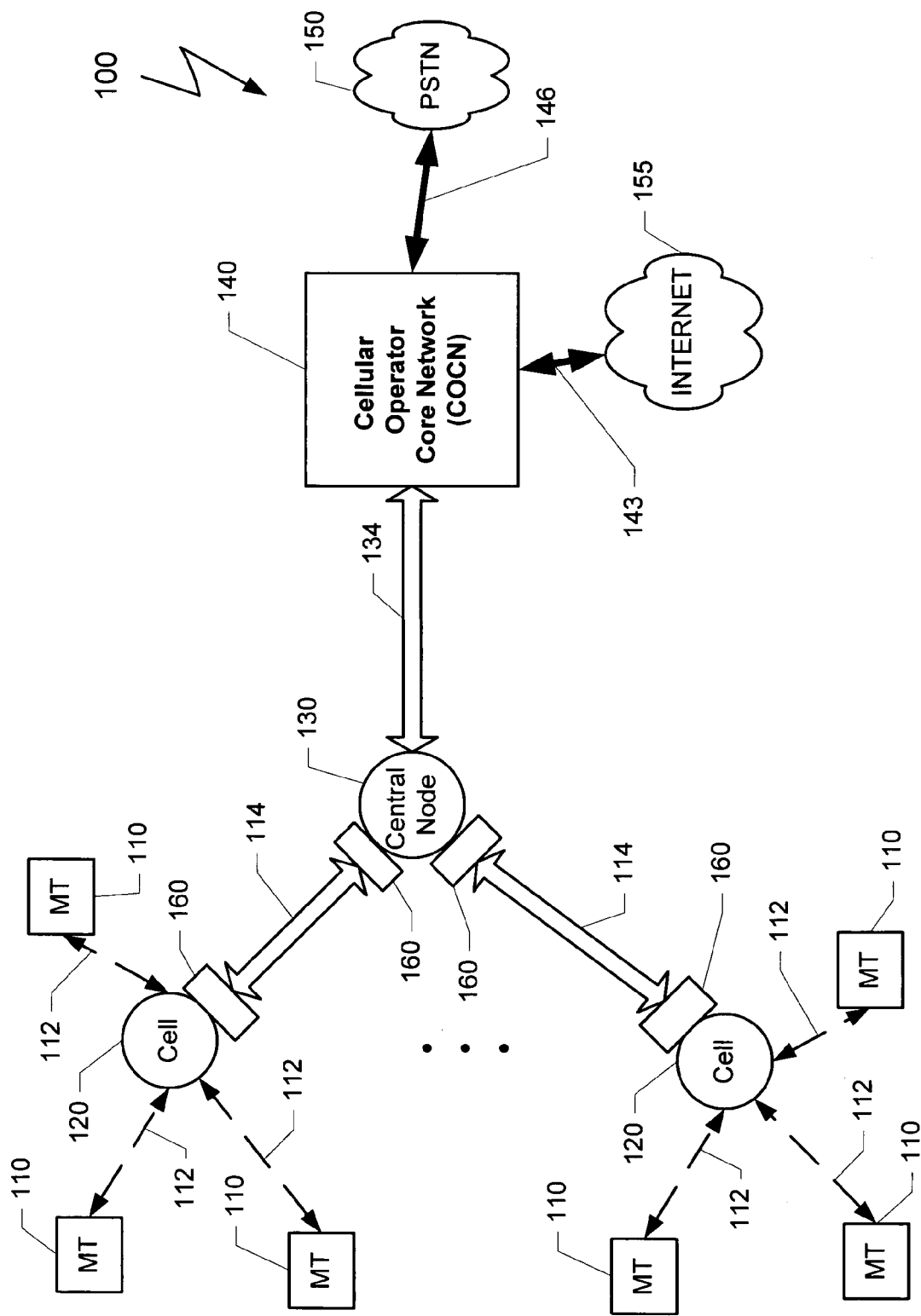
FIG. 1 is a simplified block diagram illustrating an exemplary portion of a communication network in which an exemplary embodiment of the present invention is used.

The disclosure can be further understood with reference to the drawings in which like numerals represent like elements throughout the several views. For convenience, only some elements of the same group may be labeled. The drawings illustrate examples of the disclosed embodiments and are not intended to limit the disclosure in any way. Therefore, features shown in the drawings are chosen for convenience and clarity of presentation only.

FIG. 1 illustrates a block diagram with relevant elements of a portion of an exemplary cellular network 100. Cellular network 100 may comprise a plurality of mobiles terminals (MT) 110 wirelessly connected 112 to a fixed network. The fixed network can comprise a plurality of cells 120, one or more central nodes 130 and a cellular operator's core network (COCN) 140. A cell 120 is connected or communicatively coupled with the central node 130 via a bearer 114. The central node 130 is connected or communicatively coupled with COCN 140 via communication line 134. The COCN 140 can be connected via a circuit switch connection 146 to a Public Switched Telephone Networks (PSTN) 150 and via a packet switch connection 143 to the Internet 155. In order to increase the utilization and/or improve the QoS over the fix network 100, a pair of exemplary load reducer modules (LRM) 160 can be installed at each end of one or more bearers 114.

Bearer 114 can be cable wires (e.g. the E1 link), fiber optics, or other communication links. The transportation over bearer 114 may be based on different types of communication protocols, including but not limited to the ATM protocol, TDM-A protocol, etc. Bearer 114 can comprise a single communication line carrying data in both directions, uplink or downlink. Alternatively, bearer 114 can comprise two or more communication lines with each one carrying data in one direction, uplink or downlink, or both.

The COCN 140 can include common cellular network elements, such as a mobile switching center (MSC), serving GPRS support node (SGSN), gateway GPRS support node (GGSN), home location register (HLR) etc. which are not shown in the drawings. Exemplary MTs 110 can include a cellular telephone, a PDA with cellular capabilities, or any other computerized device that can generate and/or receive audio, video, computer data or any combination of those via a cellular network.

Cell 120 is an intermediate node for radio transmission/reception with MT 110 that are currently located in a geographical area that is served by the Cell 120. A single cell 120 can serve a plurality of MTs 110. An exemplary cell can be a Base Transceiver Station (BTS). A plurality of cells 120 are administered by the central node 130. An exemplary central node 130 can be a BSC (Base Station Controller), for example. Cell 120 can communicate with the central node 130 over bearer 114 using TDM-A network protocol implementing Abis interface as a layer 2 (Data Link layer) protocol, for example. When data is moving across the physical links 114 by using Abis interface, the data is divided into in Abis frames.

Central node 130 controls the plurality of cells 120 and MTs 110, which are connected via the central node 130. Among other tasks the central node 130 is responsible for centralized operation of the cells. It can switch data chunks, such as Abis frames for example, between the different cells 120. Information on cellular network technology and operation is well known in the art and shall thus not be described in detail here. Detailed information about the function of cellular networks can be obtained from many sources and can be found in relevant web sites.

An exemplary embodiment of an LRM 160 is capable of adjusting the load that is transmitted toward the two nodes, cell 120 and central node 130 (FIG. 1). Adjusting the load can be implemented, by an exemplary LRM 160, by intercepting the data transportation over the relevant bearer 114; manipulating the data over one or, more channels that are established over the bearer and transferring the manipulated data toward a mating LRM 160 on the other end of the bearer 114. The manipulated data has fewer bits than the original data. In addition, the LRM 160 is capable of changing the bit rate that is used over the connection between an MT 110 and the central node 120 via its associated wireless connection 112, cell 120 and the relevant bearer 114, wherein changing the bit-rate depends on the load over bearer 114 after manipulating received data.

On the other side of bearer 114, in the mating LRM 160, an exemplary de-manipulator module is capable of reconstructing the reorganized chunk of data into a legal format that matches the type of the session and the content of the payload of the original received data at the LRM 160, which locates at the access of bearer 114. However, although the exact content of the de-manipulated data can be different from the originally received data, the user experience is not affected. More information regarding the operation of an exemplary LRM 160 is disclosed below in conjunction with description of FIG. 2 and FIG. 3.

Figure 2:
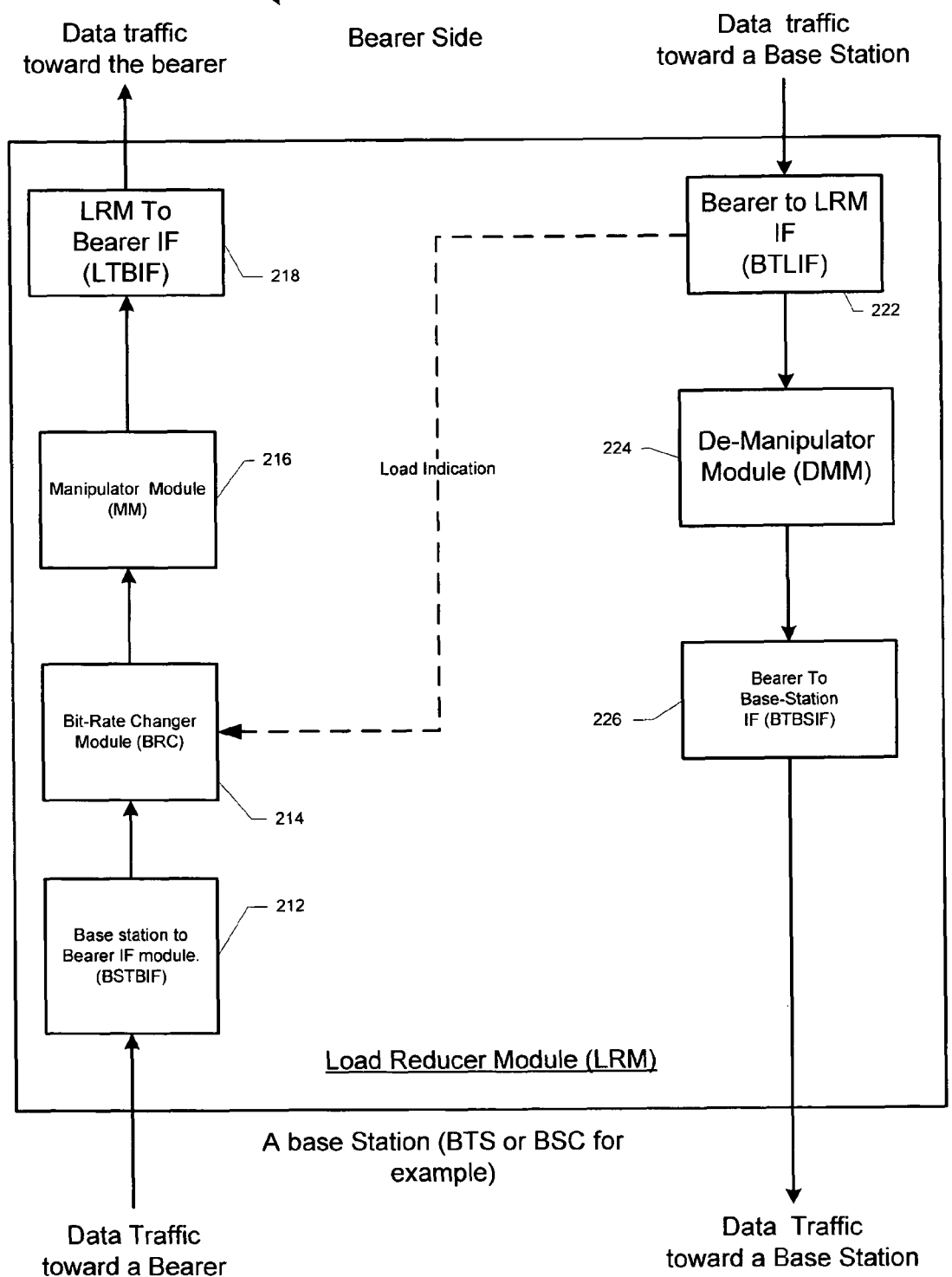
FIG. 2 schematically illustrates a block diagram with relevant elements of an exemplary load reducer module (LRM) that operates according to certain teachings of the present disclosure.

FIG. 2 illustrates a block diagram with relevant elements of an exemplary embodiment of a load reducer module (LRM) 200 that operates according to certain, teachings of the present disclosure. The exemplary LRM 200 that is illustrated in FIG. 2 can be used in a junction between a cell 120 or a central node 130 (FIG. 1) and its associated bearer 114 (FIG. 1) (i.e., units 160 in FIG. 1). The LRM 200 may intercept the communication between a cell 120 or central node 130 and its relevant bearer 114. Among other tasks, the LRM 200 can be adapted to analyze the volume of the data traffic received from the associated bearer. Based on the volume of the received traffic, an exemplary LRM 200 is capable of adjusting the load that is transmitted toward the two nodes, cell 120 and central node 130 (FIG. 1). Adjusting the load can be implemented by an exemplary LRM 200 by changing certain control bits in data chunks that are sent toward the bearer. Such an operation will control the bit-rate that is currently used by one or more sources of the data that are located on the other side of the bearer. In addition, an exemplary LRM 200 may manipulate the data toward the bearer over the data link layer, to reduce the number of bits transmitted over the bearer.

In the other direction, from the bearer 114, the LRM 200 can be adapted to de-manipulate the data chunks over the data link layer into a standard data chunk to be transmitted toward the associated cell 120 or central node 130 (FIG. 1).

In some embodiments of the present invention, the LRM 200 can be adapted to receive QoS definitions. Based on the QoS definitions, the LRM 200 can manipulate the bit-rate of certain connections over the bearer.

An exemplary LRM 200 can be divided into two sections, a transmitting section and a receiving section. The transmitting section may comprise a Base station to Bearer IF module (BSTBIF) 212, a bit-rate change module (BRC) 214, a manipulator module (MM) 216 and an LRM to Bearer Interface module (LTBIF) 218. In the other direction, a receiving section of the LRM 200 may comprise a Bearer to LRM interface module (BTLIF) 222, a de-manipulator module (DMM) 224 and a bearer to base-station (a cell or a central node) interface module (BTBSIF) 226.

The first pair of interfaces, BSTBIF 212 and LTBIF 218, is associated with the transportation toward the bearer 114 (FIG. 1), while the second pair of interfaces BTLIF 222 and BTBSIF 226 is associated with the transportation from the bearer 114 toward a base-station, a cell 120 or central node 130. An exemplary BSTBIF 212 can get the data chunks that are transmitted over the physical link between a base station and the LRM 200, and based on the media access control address, may deliver a plurality of media data units. In an embodiment of the present invention in which a base station is a BSC or BTS and the bearer is E1, then BSTBIF 212 can be adapted to receive E1 data units, process them according to Abis interface protocol and deliver Abis frames to BRC 214.

De-manipulated standard data chunks of media from DMM 224 are transferred to the BTBSIF 226. The BTBSIF 226 divides the data of the de-manipulated media data chunks into one or more payloads of E1 data units according to the E1 protocol, and sends the E1 data units toward its associated BTS 120 or BSC 130 (FIG. 1) via bearer 114.

Nonstandard media data units from MM 216 are transferred to the LTBIF 218. The LTBIF 218 may divide the data of the nonstandard media data units into one or more E1 data units according to the E1 protocol; and send the E1 data units over bearer 114 (FIG. 1) toward the mating LRM 160 on the other side of the connection.

An exemplary BTLIF 222 can get the transportation that is transferred from a mating LRM via bearer 114. The BTLIF 222 receives the E1 data units, and processes the received E1 data units according to the E1 protocol to organize the data into nonstandard media data units. The nonstandard media data units are transferred to the DMM 224. In addition to its data interfacing task, the BTLIF 222 can be adapted to monitor the volume of the received traffic, which reflects the load over bearer 114.

In an exemplary embodiment of the present invention, monitoring the volume of the received traffic can be implemented by calculating the bit-rate of the currently received data from the bearer. The load over bearer 114 can be calculated as the percentage of the current received bit-rate from the maximum bit-rate of bearer 114. Information on the load can be transferred to the BRC 214. In one exemplary embodiment of the present invention, the BTLIF 222 can be adapted to measure the load periodically and to transfer the load indication to the BRC 214. In an alternate embodiment, the BRC 214 may initiate a cycle of monitoring the load to be executed by the BTLIF 222.

An exemplary MM 216 can operate to improve the bandwidth utilization over the bearer 114. The MM 216 can be capable of aggregating media data units and/or manipulating the media data and/or organize the media data according to a non-standard data link protocol to be carried over the bearer 114, etc. The outcome of the operation of the MM 216 is a reduction in the number of bits that are transmitted over the associated bearer. On the other side of the bearer, in a mating LRM 200, an exemplary DMM 224 may convert the manipulated data into the original data format. An exemplary MM 216 may remove: padding bits, idle data frames, unused data frames, etc. Alternatively, or additionally, the MM 216 may further compress the media data, etc. Respectively, the DMM 224 may add the removed data such as padding bits, idle frames and/or decompress the further compression, etc. Detailed information about the function of a exemplary MM 216 and DMM 224 can be obtained from many sources. For example U.S. patent application Ser. Nos. 11/194,918; 10/830,081; 11/408,418 discloses several methods that can be implemented by exemplary embodiments of the MM 216 and DMM 224.

An exemplary BRC 214 can be capable of receiving information about the volume of the data traffic that is carried over the bearer from the mating LRM. The information can be received from the BTLIF 222 as it is described above. If the received load is below a threshold level, then the media data chunks can be transferred as is from the BSTBIF 212 to the MM 216. If the received load exceeds the threshold level, then the BRC 214 is adapted to parse the received media data chunks, such as payload of Abis frames, according to Abis protocol, and to search for certain control bits that lead a destination of the media to reduce its bit rate. The destination can be a cellular telephone or cellular device, for example. For an Abis frame carrying compressed audio based on AMR standard, an exemplary control bit can be C23, C24, and C25 as well as the Request or Indication Flag (RIF) of the Abis frame.

Table 1 presents the requested AMR bit-rate along with the relation between a combination of the controls bit and relevant bit-rate:

| Control bits combination C23; C24; C25 | AMR - Bit rate (kbps) |
| --- | --- |
| 0; 0; 0 | 4.75 |
| 0; 0; 1 | 5.15 |
| 0; 1; 0 | 5.90 |
| 0; 1; 1 | 6.70 |
| 1; 0; 0 | 7.40 |
| 1; 0; 1 | 7.95 |
| 1; 1; 0 | 10.2 |
| 1; 1; 1 | 12.2 |

If the value of RIF is zero, then the control bits C23, C24, and C25 represent a request to an MT on the other end of the connection to change the bit-rate that is used by its AMR codec to the requested bit-rate. If the value of RIF is one, then the control bits C23, C24, and C25 represent the bit-rate that was used in compressing the audio of the currently received and next Abis frame.

Based on the load indication that was received from the BTLIF 222 and the value of the RIF, an exemplary BRC 214 can change the value of the control bits C23, C24, and C25. In some embodiments of the present invention, the BRC 214 can be capable of reducing the value of the control bits when the load exceeds the threshold level. More information about the bit-rate changing process is disclosed below in the description of FIG. 3.

An alternate embodiment of the present invention may respond to low load over the bearer by changing the control bits in order to increase the bit rate in order to improve the quality of the audio session.

Other exemplary embodiments of the present invention (not shown in the drawing) can have a communication module instead of, or in addition to, the BRC 214. The communication module can be capable of establishing a connection with a central controller of the cellular network (a BSC, or RNC for example) or with a source of data, a web-server, a video server, etc. The connection can be based on the Internet Protocol (TCP/IP, for example) or any other type of protocol that can be used between two devices. Over the connection, an indication about the current load, which was calculated by the BTLIF 222 can be sent, signaling to the central node or to the server to reduce the bit rate that is sent toward the bearer.

Yet, in another exemplary embodiment of the present invention, the BTLIF 222 may generate and send an indication to the associated node that one of the dummy bearers/trunks failed thereby causing the node to reduce the load.

Figure 3:
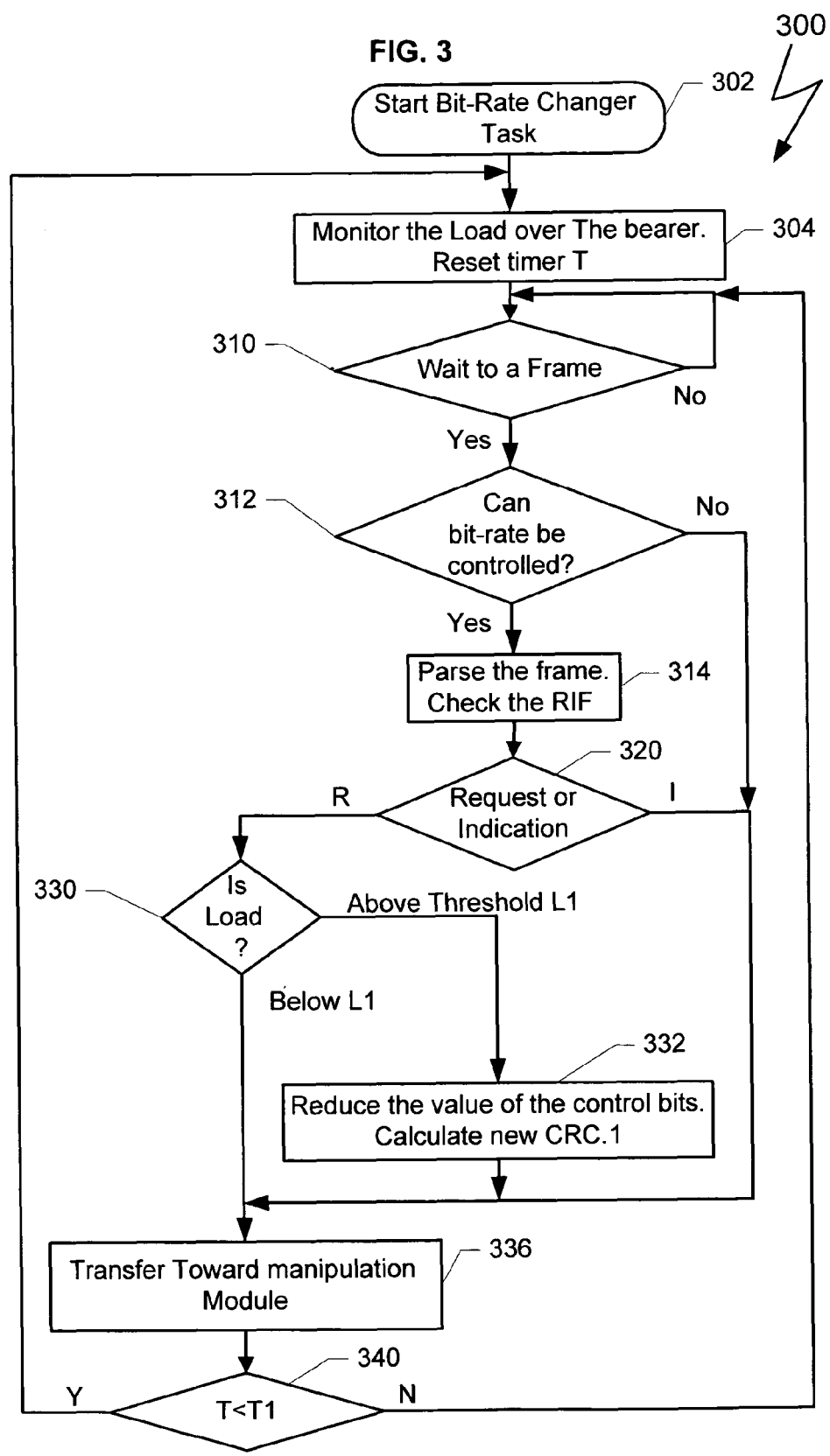
FIG. 3 illustrates a flowchart showing relevant steps of an exemplary bit-rate changer task at an exemplary LRM.

FIG. 3 illustrates relevant steps of an exemplary process 300 for adjusting the bit-rate of a source of data that is transmitted toward the two intermediate nodes: cell 120 and central node 130 (FIG. 1). The process 300 can be implemented by a Bit-Rate Changer (BRC) 214 (FIG. 2). The process 300 can be initiated 302 upon the initiation of an LRM 200 (FIG. 2) and may run as long as the LRM 200 is active. After initiation, the load of the traffic transmitted over the bearer 114 (FIG. 1) toward the BRM 160 (FIG. 1) is measured 222. Measuring the load can be executed by the BTLIF 222, for example. In an exemplary embodiment of the present invention, the BRC 214 may send a sampling command to the BTLIF 222. In response, the BTLIF 222 may calculate the bit-rate that is currently being received via bearer 114. The currently received bit-rate can be compared to the maximum bit rate that can be carried by the bearer 114. The percentage of the currently received bit-rate from the maximum bit-rate of the bearer can be referred to as the load indication. The load indication can be transferred to the BRC 214. Other embodiments may implement other types of measurements. For example, in other embodiments the LTBIF 218 (FIG. 2) can be adapted to measure the current bit rate for data that is transmitted toward the bearer 114. Yet in an alternate embodiment, both interfaces, the BTLIF 222 and the LTBIF 218 can be adapted to measure the current bit rate of data going to and from the bearer 114 and the BRC 214 can be adapted to make decisions on one or both the two measurements, etc.

At the end of the measuring process, timer T is reset 304. Timer T is used for defining the sampling period of the load. A common sampling period (T1) can be on the order of a few tens of milliseconds up to a few seconds, for example.

After resetting the timer T, the process 300 may wait 310 for receiving a media data unit. An exemplary data unit can be an Abis frame. Upon receiving the media data unit, a decision is made by the BRC 214 as to whether 312 the bit-rate of the received data can be controlled. The decision can be based on the type of media that is currently carried over the connection. For example, an Abis frame carrying compressed audio according to the AMR protocol has the option to request a destination of the media data unit to change the bit-rate of its codec. If 312 the bit rate can not be controlled, then the Abis frame is transferred 336 toward the MM 216 (FIG. 2) without any changes. For instance, media data units carrying compressed audio based on a Full Rate (FR) codec do not have the option of controlling the bit rate of the data that is created by the receiving end of an FR Abis frame, and as such, is passed without any changes.

If 312 the bit-rate can be controlled, then the data unit or frame is parsed 314 and a decision is made as to whether 320 the data unit carries an indication or a request. This decision can be based on the status of Request or Indication Flag (RIF). If the RIF=1, then this reflects a request. If the RIF=0, then this reflects an indication. If 320 the RIF reflects an indication, then the process 300 continues at step 336 and the received data unit is transferred as is to the MM 216. If the RIF reflects a request, then control bits C23; C24 and C25 are a request for a bit rate to be used by the codec of the destination of the data unit. The different combinations of the control bits are illustrates above in Table 1.

In case 320 that the control bits reflect a request to change the bit rate which is used by the codec of the destination of the data frame, then the current load indication is analyzed 330 and can be compared to a threshold level L1. The level L1 can reflect a load that is close to the maximum capacity over the bearer, 80% of the maximum capacity for example. Some embodiments of the present invention may use other values for L1. The capacity of the bearer can be defined as the maximum bit rate that can be carried by the bearer, for example.

If 330 the current load over the bearer 114 (FIG. 1) is less than the level L1, the control bits C23; C24 & C25 remain as is and the data unit is transferred 336 as is toward the manipulation module 216 (FIG. 2).

If the current load indication is above the level L1, then the value of the control bits is decreased 332, requesting a lower bit rate. A new cyclic redundancy code (CRC1) is calculated to match the new value of C23; C24 & C25. In case the value is already zero, which indicates the minimum bit rate of 4.75 Kbps (table 1), then the value of C23; C24 & C25 remain as is. After processing the control bits, the data frame is transferred 336 toward the manipulation module 216.

After transferring the data frame toward the MM 216 (FIG. 2), the timer T is checked and a decision is made whether 340 T is greater than T1. If T is greater than T1 the process 300 returns to step 304 for monitoring the current load received from the bearer. If T is smaller than T1, then the process 300 may return to step 310 waiting for the next data frame.

In the present disclosure, the words "unit," "element," "module" and "logical module" can be used interchangeably. Anything designated as a unit or module can be a stand-alone unit or a specialized or integrated module. A unit or a module can be modular or have modular aspects allowing it to be easily removed and replaced with another similar unit or module. Each unit or module may be any one of, or any combination of, software, hardware, and/or firmware.

In the description and claims of the present disclosure, "comprise," "include," "have," and conjugates thereof are used to indicate that the object or objects of the verb are not necessarily a complete listing of members, components, elements, or parts of the subject or subjects of the verb.

It will be appreciated that the above described apparatus, systems and methods can be varied in many ways, including, changing the order of steps, and the exact implementation used. The described embodiments include different features, not all of which are required in all embodiments of the present disclosure. Moreover, some embodiments of the present disclosure use only some of the features or possible combinations of the features. Different combinations of features noted in the described embodiments will occur to a person skilled in the art. Furthermore, some embodiments of the present disclosure can be implemented by combination of features and elements that have been described in association to different exemplary embodiments along the discloser. The scope of the invention is limited only by the following claims.

What is claimed is:

1. A method for controlling the load over a bearer that communicatively couples two intermediate nodes, a first node and a second node in a cellular fixed network, wherein each end of the bearer is communicatively coupled to its associated node via a first load reducer module and a second load reducer module respectively, the method comprising the actions of:

measuring a current load over the bearer;

adjusting, based on the measured load over the bearer, the load that is transmitted toward the two intermediate nodes by requesting a change in the bit rate used by a source of data that is transmitted toward the two intermediate nodes;

intercepting, at the first load reducer module, a data unit received from the first node, wherein the data unit carries a media payload and the media payload targeted toward a destination device;

determining whether the data unit is capable of impacting the bit rate that is used by the destination device and, based on the measured load;

changing a portion of the data unit, which impacts the bit rate used by the destination device; and transferring the changed data unit toward the bearer.

2. The method of claim 1, wherein each load reducer is capable of reducing the number of bits that are transmitted toward the bearer.

3. The method of claim 1, wherein the first node is a base station controller (BSC) and the second node is base transceiver station (BTS).

4. The method of claim 1, wherein the first node is BTS and the second node BSC.

5. The method of claim 1, wherein the destination device is a mobile terminal.

6. The method of claim 1, wherein the data unit is an Abis frame.

7. The method of claim 6, wherein the step of determining whether the data unit is capable of impacting the bit rate of the destination device, further comprising: (i) parsing the Abis frame searching for a Request or Indication Flag (RIF) and its associated control bits; (ii) determining whether the Request Indication Flag reflects a request; and (iii) changing the control bits.

8. The method of claim 1, wherein the destination device uses an adaptive multi-rate (AMR) codec.

9. The method of claim 1, wherein the step of measuring the current load over the bearer further comprises the steps of:

(i) calculating the bit rate of the currently received data traffic from the bearer;

(ii) defining the percentage of the calculated currently received bit rate from a maximum bit rate of the bearer; and (iii) presenting the defined percentage as a load parameter.

10. An apparatus for controlling the load over a bearer communicatively coupling two intermediate nodes, a first node and a second node in a cellular fixed network, wherein at least one end of the bearer is communicatively coupled to its associated node via the apparatus, the apparatus comprising:

a controller;

a manipulator module capable of receiving data traffic that is transferred toward the bearer, manipulating the data traffic by reducing the number of bits in the received data traffic, and transferring the manipulated data traffic toward the bearer; and a bit rate changer module capable of adjusting the load that is transmitted toward the first and second nodes by changing the bit rate used by a source of data, the load being adjusted by:

a load measuring module capable of measuring a current load over the bearer and adjusting the load by the bit rate changer module is based on the measured current load over the bearer;

the bit rate changer module is capable of adjusting the load by changing the bit rate used by a source of data that is transmitted toward the two intermediate nodes;

(a) intercepting a data unit received from the first node, wherein the data unit carries a media payload and the media payload targeted toward a destination device;

(b) determining whether the data unit is capable of impacting the bit rate that is used by the destination device and changing a portion of the data unit which impacts the bit rate used by the destination device; and (c) transferring the changed data unit toward the bearer.

11. The apparatus of claim 10, wherein the first node is a base station controller (BSC) and the second node is a base transceiver station (BTS).

12. The apparatus of claim 10, wherein the first node is a base transceiver station (BTS) and the second node is a base station controller (BSC).

13. The apparatus of claim 10, wherein the destination device is a mobile terminal.

14. The apparatus of claim 10, wherein the data unit is an Abis frame.

15. The apparatus of claim 10, wherein the codec of a destination device is an adaptive multi-rate (AMR) codec.

16. An apparatus for controlling the load over a bearer communicatively coupling two intermediate nodes, a first node and a second node in a cellular fixed network, wherein at least one end of the bearer is communicatively coupled to its associated node via the apparatus, the apparatus comprising:

a controller;

a manipulator module capable of receiving data traffic that is transferred toward the bearer, manipulating the data traffic by reducing the number of bits in the received data traffic, and transferring the manipulated data traffic toward the bearer; and a load measuring module capable of measuring a current load over the bearer and adjusting the load by the bit rate changer module is based on the measured current load over the bearer by:

(a) calculating the bit rate of the currently received data traffic from the bearer;

(b) defining the percentage of the calculated currently received bit rate from a maximum bit rate of the bearer; and (c) presenting the defined percentage as a load parameter; and a bit rate changer module capable of adjusting the load that is transmitted toward the two nodes based on the measured current load over the bearer;

the bit rate changer module is capable of adjusting the load by changing the bit rate used by a source of data that is transmitted toward the two intermediate nodes.

17. The apparatus of claim 16, further capable of adjusting the load that is transmitted toward the two intermediate nodes by informing one of the intermediate nodes to adjust the load that is transmitted toward the other intermediate node.

18. The apparatus of claim 17, wherein causing one of the intermediate nodes to adjust the load is implemented by signaling that a dummy link fails.

19. The apparatus of claim 16, wherein the bit rate changer module is capable of: (a) parsing the Abis frame searching for a Request Indication Flag (RIF) and its associated control bits; (b) determining whether the Request Indication Flag reflects a request; and (c) changing the control bits based on the calculated load parameter.

* * * * *